United States Patent [19]

Buer et al.

[11] Patent Number: 4,469,215
[45] Date of Patent: Sep. 4, 1984

[54] CAN COUNTER SLIDE

[76] Inventors: Jeffrey J. Buer, 4705 Lakewood Dr., Lakewood, Iowa 50211; Byron C. Harris, R.R. #1, Anita, Iowa 50020

[21] Appl. No.: 345,803

[22] Filed: Feb. 4, 1982

[51] Int. Cl.³ .............................................. B65G 47/24
[52] U.S. Cl. .................................... 198/382; 198/397; 198/503
[58] Field of Search ............... 198/396, 397, 382, 400, 198/503, 453, 452, 446, 461

[56] References Cited

U.S. PATENT DOCUMENTS

| | | | |
|---|---|---|---|
| 2,324,246 | 7/1943 | Thompson et al. | 198/446 |
| 2,530,419 | 11/1950 | Bourland | 198/446 |
| 2,632,588 | 3/1953 | Hoar, Jr. | 198/503 |
| 3,651,921 | 3/1972 | Hill | 198/461 |
| 3,677,390 | 7/1972 | Parker et al. | 198/382 |
| 4,164,279 | 8/1979 | Dubuit | 198/461 |
| 4,201,285 | 5/1980 | Chamberlain | 198/400 |
| 4,328,887 | 5/1982 | Beard et al. | 198/396 |
| 4,395,625 | 7/1983 | Schutt | 198/446 |

Primary Examiner—Joseph E. Valenza
Assistant Examiner—Kyle E. Shane
Attorney, Agent, or Firm—Zarley, McKee, Thomte, Voorhees & Sease

[57] ABSTRACT

The can counter slide of the present invention comprises an elongated slide having a plurality of V-shaped grooves extending longitudinally therein. The slide is inclined so that the cans, when placed on the slide, will fit within the grooves and slide downwardly toward the lower end. At the lower end are a plurality of photo-electric cells, one for each of the V-shaped grooves. These photo-electric cells sense and count each can as it slides off the lower end of the slide. A vibrator can be applied to the slide to cause the slide to vibrate and thereby enhance the ability of the cans to slide downwardly in the V-shaped grooves. Also, a rotating brush can be provided adjacent the lower end of the slide to cause each of the cans to speed up and thereby separate from the other cans in the V-shaped groove, just prior to the time that the cans encounter the photo-electric cells.

1 Claim, 6 Drawing Figures

U.S. Patent  Sep. 4, 1984  4,469,215
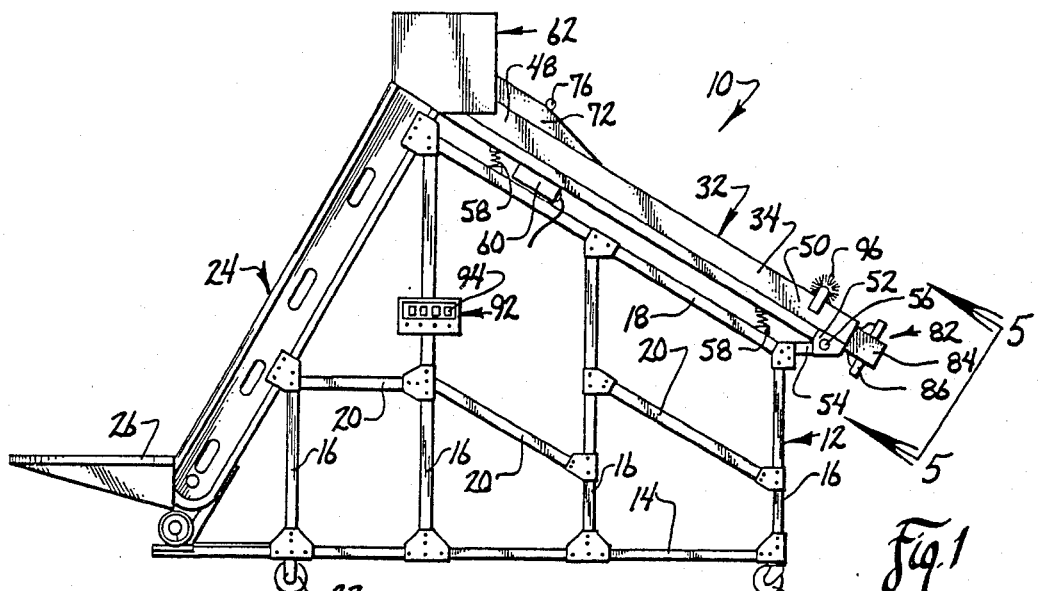
Fig. 1
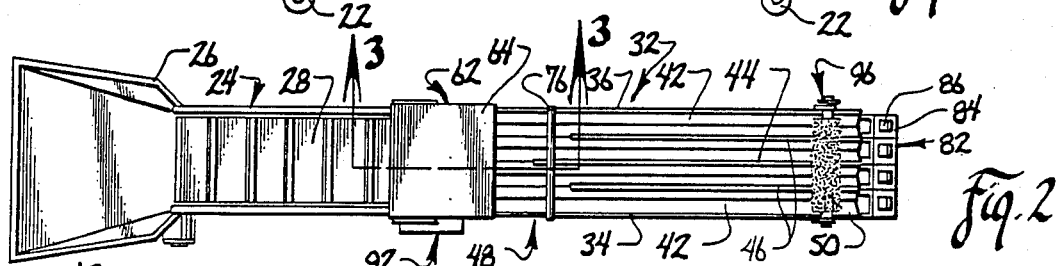
Fig. 2
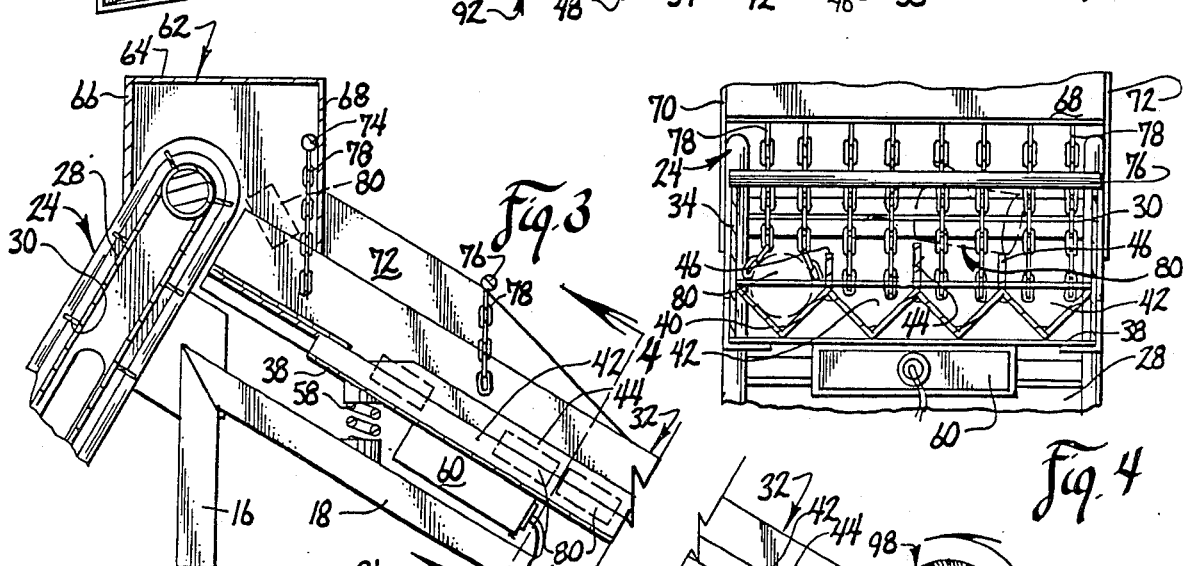
Fig. 3
Fig. 4
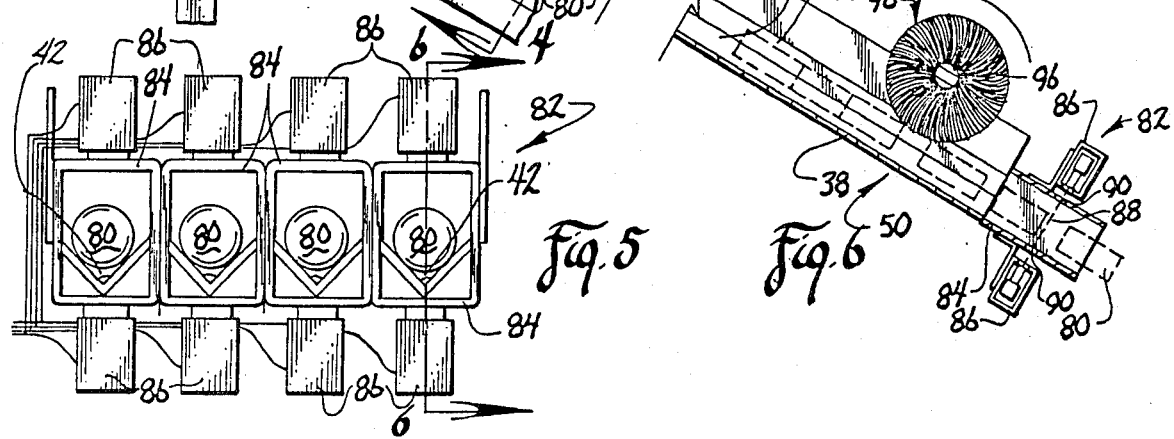
Fig. 5
Fig. 6

CAN COUNTER SLIDE

BACKGROUND OF THE INVENTION

This invention relates to a can counter slide.

Many states have enacted statutes which require a deposit for soft drink and beer cans. The consumers then return the cans to grocery stores or other retail outlets and receive the deposit in return for the can. The cans are then collected from the retail outlets, counted, and appropriate credits are given to the retail outlets by the manufacturers and distributors of the beverages within the cans.

Because of the very large numbers of cans which are involved, the counting of these cans becomes cumbersome. Different means have been provided for counting these cans, but in most cases the devices known heretofore are slow and cumbersome.

Therefore, a primary object of the present invention is the provision of an improved device for counting cans.

A further object of the present invention is the provision of an improved device for counting cans wherein the cans may be counted quickly and automatically.

A further object of the present invention is the provision of a device for counting cans at high rates of speed while at the same time maintaining good accuracy in the count.

A further object of the present invention is the provision of a device which is simple and sturdy in construction and which will endure long use over a long period of time.

A further object of the present invention is the provision of a device which is simple in operation and which has a minimum of breakdowns.

SUMMARY OF THE INVENTION

The present invention utilizes an inclined slide having a plurality of V-shaped grooves therein for receiving each of the cans. The cans slide downwardly in the V-shaped grooves by gravity. The sliding may be enhanced by applying a vibrator to the slide if desired.

At the lower end of the slide a plurality of photoelectric cells are provided for sensing each can as it passes off the lower end of the slide. The photo-electric cells are capable of detecting each can separately so long as there is even the slightest space between adjacent cans as they slide down the slide. However, in order to insure that there is a space between the cans, a rotating brush or other rotating means may be provided adjacent the lower end of the slide. This brush engages the cans and speeds them up just prior to the time they encounter the photoelectric cell. By speeding up the cans one at a time with the brush, it is possible to insure that a space occurs between adjacent cans.

The photo-electric cell is connected to a digital display device which displays the count sensed by the various photoelectric cells.

BRIEF DESCRIPTION OF THE DRAWINGS

FIG. 1 is a side elevational view of the can counter slide of the present invention.

FIG. 2 is a top plan view of the device shown in FIG. 1.

FIG. 3 is a sectional view taken along line 3—3 of FIG. 2.

FIG. 4 is a sectional view taken along line 4—4 of FIG. 3.

FIG. 5 is a sectional view taken along line 5—5 of FIG. 1.

FIG. 6 is a sectional view taken along line 6—6 of FIG. 5.

DETAILED DESCRIPTION OF THE PREFERRED EMBODIMENT

Referring to the drawings, the numeral 10 generally designates the can counter slide of the present invention. A support frame 12 comprises a bottom frame member 14, a plurality of vertical frame members 16, an upper inclined frame member 18, and a plurality of truss members 20. Wheels 22 are provided on the lower end of support frame 12 so as to provide mobility to the can counter slide 10.

A conveyor assembly 24 includes a feed hopper 26, and a conveyor belt 28 having lugs or brackets 30 which provide means for catching the cans and carrying them upwardly to the upper end of conveyor 24. The cans are deposited in hopper 26 which is inclined downwardly so as to cause the cans to move towards the conveyor belt 28. The lugs 30 catch the cans and carry them upwardly to the upper end of the conveyor.

An elongated slide assembly 32 is mounted above upper inclined frame member 18. Slide assembly 32 comprises side members 34, 36 and bottom wall 38. Mounted above bottom wall 38 is a corrugated bottom wall 40 having a plurality of channels 42, each of which is upwardly presented and each of which is V-shaped in cross-section. An elongated central rib 44 is provided at the vertical apex formed by the adjacent edges of the V-shaped channel 42 along the center line of the slide assembly 32. Each of the other V-shaped apexes adjacent the channels 42 is provided with a secondary rib 46. Secondary ribs 46 are of a lesser height than central rib 44.

Slide assembly 32 includes an upper end 48 and a lower end 50.

A hinge bracket 52 is mounted adjacent the lower end 50 of slide assembly 32, and hinge bracket 52 is pivotally mounted to a support member 54 on support frame 12. Hinge bracket 52 is adapted to pivot about a horizontal axis 56. A pair of springs 58 are interposed between slide frame assembly 32 and inclined frame member 18 so as to yieldably hold slide frame assembly 32 against pivotal movement about axis 56. A power vibrator 60 is attached to slide assembly 32 and when actuated, is adapted to impart a vibrating movement to slide assembly 32. Springs 58 yield in response to this vibrating movement.

A hood assembly 62 is provided in covering relation over the upper end of conveyor belt 28 and the upper end of slide assembly 32. Hood assembly 62 includes a top wall 64, a rear wall 66, a front wall 68 and side walls 70, 72. Extending between side walls 70, 72 in spaced relation above corrugated bottom wall 40 of slide assembly 32 are a pair of hanger rods 74, 76. Hanging from hanger rods 74, 76 are a plurality of chains 78. While chains are preferred, other flexible members may be utilized without detracting from the invention. The purpose of chains 78 is to yieldably force the cans downwardly into the V-shaped channels 42 after the cans leave the upper end of conveyor belt 28.

Chains 78 and ribs 44, 46 cooperate to insure that the cans become oriented with their cylindrical axis parallel to the longitudinal axis of slide assembly 32. Referring to FIGS. 3 and 4, the cans 80 are shown tumbling off the upper end of conveyor belts 28. As the cans tumble off the conveyor belt 28, they strike chains 78 and are forced downwardly. Referring to FIG. 4, a can 80 which is oriented cross-ways in slide assembly 32 is tilted because of the different heights of the ribs 44, 46. As the can begins to roll down the inclined slide, it tends to turn by virtue of this tilted orientation, and ultimately it turns so that it falls into the V-shaped channels 42 with its longitudinal axis extending in a direction parallel to the longitudinal axes of the channels 42.

Adjacent the lower end of slide assembly 32 is a counter assembly 82. Counter assembly 82 includes a plurality of tubes 84, each of which is in registered alignment with one of the channels 42 in slide assembly 32. This permits the cans to continue their sliding movement outwardly from the bottom ends of channels 42 and through tubes 84. Mounted on the upper and lower surfaces of each tube 84 is a photo-electric cell 86 which is adapted to project a photo-electric beam 88 through suitable apertures 90. Beam 88 is in registered alignment with the longitudinal centerline of each V-shaped channel 42 so that as the cans 80 pass through tubes 84 they break the continuity of the beam 88. Cells 86 are electrically connected to a digital display unit 92 which is adapted to record each time the photo-electric beam 88 is intersected by a can. The number of times that this beam is interrupted is displayed on a digital display window 94 on device 92.

The cans progress downwardly through V-shaped channels 42 at a speed which makes it nearly impossible to count the cans with the naked eye. However, a slight gap usually appears between each can as it passes through tube 84, and consequently the photo-electric cells are able to sense the correct number of cans which pass through tubes 84.

However, to insure that a gap does exist between each can as it slides between adjacent cans as they slide through tube 84, a rotating brush may 96 may be provided in a position which will engage cans 80 immediately prior to the time that they enter tube 84. Brush 96 includes an outer peripheral surface 98 which is positioned in spaced relation above slide assembly 32. The distance of surface 98 above slide assembly 32 is chosen so that surface 98 engages each can 80 as it passes below rotating brush 96. The rotational speed of brush 96 is chosen so that the velocity of surface 98 is slightly greater than the velocity of cans 80 as they slide down slide assembly 32. Consequently, when surface 98 engages each can, it imparts an additional velocity thereto, thereby causing it to become separated from the can which immediately proceeds it. This insures that there is a gap between each can as is illustrated in FIG. 6. While a rotating brush is preferred, other rotating members could also be utilized.

The can counter described above provides means for counting a great number of cans in a very short period of time. The cans slide downwardly in slide assembly 32 at a velocity which is so great that the human eye cannot count the cans. However, the photo-electric cells sense each can and record it on display window 94. It is thus possible to count a great number of cans in a very short time. The device is simple, economical to manufacture, and is durable in use. The vibrator 60 is optional, and if used, will enhance the ability of the cans to slide downwardly in slide assembly 32. Similarly brush 96 is also optional.

Thus, it can be seen that the device accomplishes at least all of its stated objectives.

What is claimed is:

1. A counting device for counting a plurality of cylindrically shaped cans, comprising:

an elongated slide having opposite side walls and a bottom wall, said bottom wall being comprised of a plurality of elongated channels each of which includes a groove approximately V-shaped in cross-section, each of said channels having an upper end and a lower end;

support means holding said slide in an inclined position with said upper ends of said channels above said lower ends, counting means adjacent said lower ends of said channels; said counting means comprising a plurality of photoelectric cells, each of which is adapted to project a beam of light in a line intersection with the longitudinal axis of one of said channels, whereby moving longitudinally along said one channel will break said beam of light, conveyor means for carrying said cans to said upper ends of said channels and dropping said cans by gravity onto said upper ends of said channels, said channels being sized to receive said cans in said V-shaped grooves with the cylindrical axis of said cans being parallel to said longitudinal axes of said grooves;

the inclined position of said slide channels being sufficient to cause said cans to slide downwardly from said upper ends of said channels to said lower ends of said channels and to break said beams of light projecting from said plurality of photo-electric cells, said support means having at least one hanger member fixed thereto above said slide adjacent said upper ends of said channels; at least one flexible member having a first end attached to said hanger member and a second end positioned adjacent said channels whereby said flexible member will be struck by said cans as said cans are deposited at said upper ends of said channels by said conveyor means, and will yield in repsonse to being struck by said cans so as to permit said cans to slide downwardly within said channels, said slide including an elongated rigid rib positioned between each pair of adjacent channels and extending along the length of said slide, said ribs having an upper edge positioned a predetermined distance above the uppermost portions of said V-shaped channels, whereby said cans will strike said ribs and said flexible member and be oriented with their cylindrical axes parallel to said V-shaped channels as said cans fall by gravity from said conveyor means onto said upper end of said slide mounting means mounting said slide to said support means for relative movement with respect to said support means, said mounting means including spring means interconnecting said support means and said slide for yieldably holding said slide in a predetermined neutral position with respect to said support means, a power actuated vibrator attached to said slide and adapted to be actuated to cause vibration of said slide with respect to said support means, and a rotating member rotatably mounted about a horizontal axis adjacent and above said counting means, said rotating member being cylindrical in shape and having an outer circumferential surface positioned in spaced relation above said slide for frictionally engaging said cans as said cans pass beneath said rotating member, power means for rotating said rotating member at a speed and direction which causes said circumferential surface to move at a speed greater than the velocity of said cans as said cans move down said slide by gravity, whereby said rotating member will impart an increased speed to each of said cans when said circumferential surface engages each of said cans.

* * * * *